(12) United States Patent
Wasekura et al.

(10) Patent No.: US 11,610,490 B2
(45) Date of Patent: Mar. 21, 2023

(54) CONTROL DEVICE FOR VEHICLE AND METHOD OF OPERATING VEHICLE

(71) Applicant: TOYOTA JIDOSHA KABUSHIKI KAISHA, Toyota (JP)

(72) Inventors: Masaki Wasekura, Toyota (JP); Michio Ikeda, Nagoya (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/661,302

(22) Filed: Oct. 23, 2019

(65) Prior Publication Data
US 2020/0143689 A1    May 7, 2020

(30) Foreign Application Priority Data
Nov. 7, 2018    (JP) .............................. JP2018-209747

(51) Int. Cl.
*G08G 1/00*    (2006.01)
*G07C 5/00*    (2006.01)
(Continued)

(52) U.S. Cl.
CPC ......... *G08G 1/202* (2013.01); *G01C 21/3438* (2013.01); *G01C 21/362* (2013.01); *G05D 1/021* (2013.01); *G07C 5/008* (2013.01)

(58) Field of Classification Search
CPC ........ G06Q 50/30; G06Q 10/02; G06Q 10/00; G06Q 10/08; G06Q 10/06315; G06Q 10/047; G06Q 50/01; G06Q 10/0631; G06Q 10/025; G06Q 10/083; G06Q 10/06; G06Q 10/063; G06Q 10/06311; G06Q 10/063118; G06Q 10/109; G06Q 50/14;
(Continued)

(56) References Cited

U.S. PATENT DOCUMENTS

2016/0356615 A1* 12/2016 Arata ................. G01C 21/3438
2017/0169366 A1*  6/2017 Klein .................... G06Q 50/30
(Continued)

FOREIGN PATENT DOCUMENTS

JP    2017-182137 A    10/2017
JP    2018-105774 A     7/2018
(Continued)

*Primary Examiner* — Srilakshmi K Kumar
*Assistant Examiner* — Jing Gao
(74) *Attorney, Agent, or Firm* — Sughrue Mion, PLLC

(57) ABSTRACT

A control device for a vehicle controls a vehicle configured to provide a ridesharing service by autonomous traveling. The control device for a vehicle includes: a first information acquiring unit configured to acquire first information of a passenger who is supposed to use the ridesharing service; a second information acquiring unit configured to acquire second information of a passenger who has entered the vehicle at a pickup point; a determination unit configured to determine whether the vehicle is to depart by comparing the first information with the second information; and a vehicle control unit configured to control the vehicle based on a determination result from the determination unit. The determination unit is configured to prohibit departure of the vehicle when the first information does not match the second information.

8 Claims, 9 Drawing Sheets

(51) Int. Cl.
*G01C 21/36* (2006.01)
*G01C 21/34* (2006.01)
*G05D 1/02* (2020.01)

(58) Field of Classification Search
CPC ....... G06Q 10/063114; G06Q 10/1095; G06Q 20/10; G06Q 20/325; G06Q 10/08355; G08G 1/202; G08G 1/123; G08G 1/20; G08G 1/005; G08G 1/056; G08G 1/096816; G08G 1/096838; G08G 1/096844; G08G 1/207; G05D 1/0088; G05D 2201/0213; G05D 1/0214; G05D 1/0291; G05D 1/0257; G05D 1/0274; G05D 1/0297; G05D 1/0027; G05D 1/0011; G05D 1/0276; G05D 1/0038; G05D 1/0272; G05D 2201/0212; G01C 21/3438; G01C 21/00; G01C 21/3446; G01C 21/26; G01C 21/3407; G01C 21/3635; G01C 21/3423; G01C 21/3492; G07C 5/00; G07C 5/008; G07C 5/0816; G07C 5/0841; G07C 5/0866

See application file for complete search history.

(56) References Cited

U.S. PATENT DOCUMENTS

| | | | |
|---|---|---|---|
| 2018/0075565 A1* | 3/2018 | Myers | G06Q 30/02 |
| 2018/0136655 A1* | 5/2018 | Kim | B60N 2/002 |
| 2018/0181128 A1 | 6/2018 | Urano | |
| 2019/0054926 A1 | 2/2019 | Wasekura | |
| 2019/0080264 A1 | 3/2019 | Wasekura | |
| 2019/0103028 A1 | 4/2019 | Kobayashi et al. | |
| 2019/0311452 A1* | 10/2019 | McNabb | G06F 21/35 |
| 2019/0367036 A1* | 12/2019 | Brombach | G06K 9/00832 |

FOREIGN PATENT DOCUMENTS

| | | |
|---|---|---|
| JP | 2019-036228 A | 3/2019 |
| JP | 2019-053344 A | 4/2019 |

\* cited by examiner

CONTROL DEVICE FOR VEHICLE AND METHOD OF OPERATING VEHICLE

INCORPORATION BY REFERENCE

The disclosure of Japanese Patent Application No. 2018-209747 filed on Nov. 7, 2018 including the specification, drawings and abstract is incorporated herein by reference in its entirety.

BACKGROUND

1. Technical Field

The disclosure relates to a control device for a vehicle and a method of operating a vehicle.

2. Description of Related Art

In the related art, a ridesharing service using a vehicle which can travel autonomously is known. An on-demand bus which operates in response to a user's request for use is described in Japanese Unexamined Patent Application Publication No. 2017-182137 (JP 2017-182137 A). In the operation system of the on-demand bus, only a user having a user ID can request use of the service.

SUMMARY

However, in a place such as a pickup point, a person other than a user can also enter a service-providing vehicle. A user may allow a person who is not indicated in request information to enter a service-providing vehicle.

In a vehicle which can travel autonomously, there is no driver, unlike a taxi in the related art. Accordingly, it is difficult to manage passengers in a vehicle and a vehicle may depart in a state which is not indicated in request information. For example, a ridesharing service may be used by a person other than a user without permission.

Therefore, the disclosure is for preventing a vehicle from departing in a state which is not indicated in request information when a ridesharing service is provided using a vehicle which travels autonomously.

The gist of the present disclosure is as follows.

(1) A control device for a vehicle that controls a vehicle configured to provide a ridesharing service by autonomous traveling, the control device for a vehicle including: a first information acquiring unit configured to acquire first information of a passenger who is supposed to use the ridesharing service; a second information acquiring unit configured to acquire second information of a passenger who has entered the vehicle at a pickup point; a determination unit configured to determine whether the vehicle is to depart by comparing the first information with the second information; and a vehicle control unit configured to control the vehicle based on a determination result from the determination unit, wherein the determination unit is configured to prohibit departure of the vehicle when the first information does not match the second information.

(2) The control device for a vehicle according to (1), wherein the first information acquiring unit is configured to acquire identification information of a passenger who is supposed to use the ridesharing service and the second information acquiring unit is configured to acquire identification information of a passenger who has entered the vehicle.

(3) The control device for a vehicle according to (1), wherein the first information acquiring unit is configured to acquire the number of passengers who are supposed to use the ridesharing service and the second information acquiring unit is configured to acquire the number of passengers who have entered the vehicle.

(4) The control device for a vehicle according to any one of (1) to (3), wherein the first information acquiring unit is configured to acquire the number of passengers who are supposed to use the ridesharing service, the second information acquiring unit is configured to acquire the number of passengers who have entered the vehicle, and the determination unit is configured to prohibit departure of the vehicle when the number of passengers who have entered the vehicle is greater than the number of passengers who are supposed to use the ridesharing service and to not prohibit departure of the vehicle when the number of passengers who have entered the vehicle is equal to or smaller than the number of passengers who are supposed to use the ridesharing service.

(5) The control device for a vehicle according to any one of (1) to (4), further including a warning unit configured to give a warning to a passenger who has entered the vehicle when the first information and the second information do not match each other, wherein the determination unit is configured to remove prohibition of departure of the vehicle when the first information matches the second information after the warning.

(6) The control device for a vehicle according to any one of (1) to (5), wherein the determination unit is configured to remove prohibition of departure of the vehicle when a user who has requested use of the ridesharing service has approved of departure of the vehicle.

(7) The control device for a vehicle according to any one of (1) to (6), wherein the determination unit is configured to remove prohibition of departure of the vehicle when a stoppage time of the vehicle at the pickup point has reached a predetermined time.

(8) The control device for a vehicle according to any one of (1) to (7), wherein the predetermined time is set based on a traveling plan for the vehicle.

(9) A method of operating a vehicle configured to provide a ridesharing service by autonomous traveling, the method including: acquiring first information of a passenger who is supposed to use the ridesharing service; acquiring second information of a passenger who has entered the vehicle at a pickup point; determining whether the vehicle is to depart by comparing the first information with the second information; and prohibiting departure of the vehicle when the first information does not match the second information.

According to the disclosure, it is possible to prevent a vehicle from departing in a state which is not indicated by request information when a ridesharing service is provided using a vehicle which travels autonomously.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a control device for a vehicle and a method of operating a vehicle according to embodiments of the disclosure will be described with reference to the accompanying drawings. In the following description, the same elements will be referred to by the same reference signs.

First Embodiment

Figure 1:
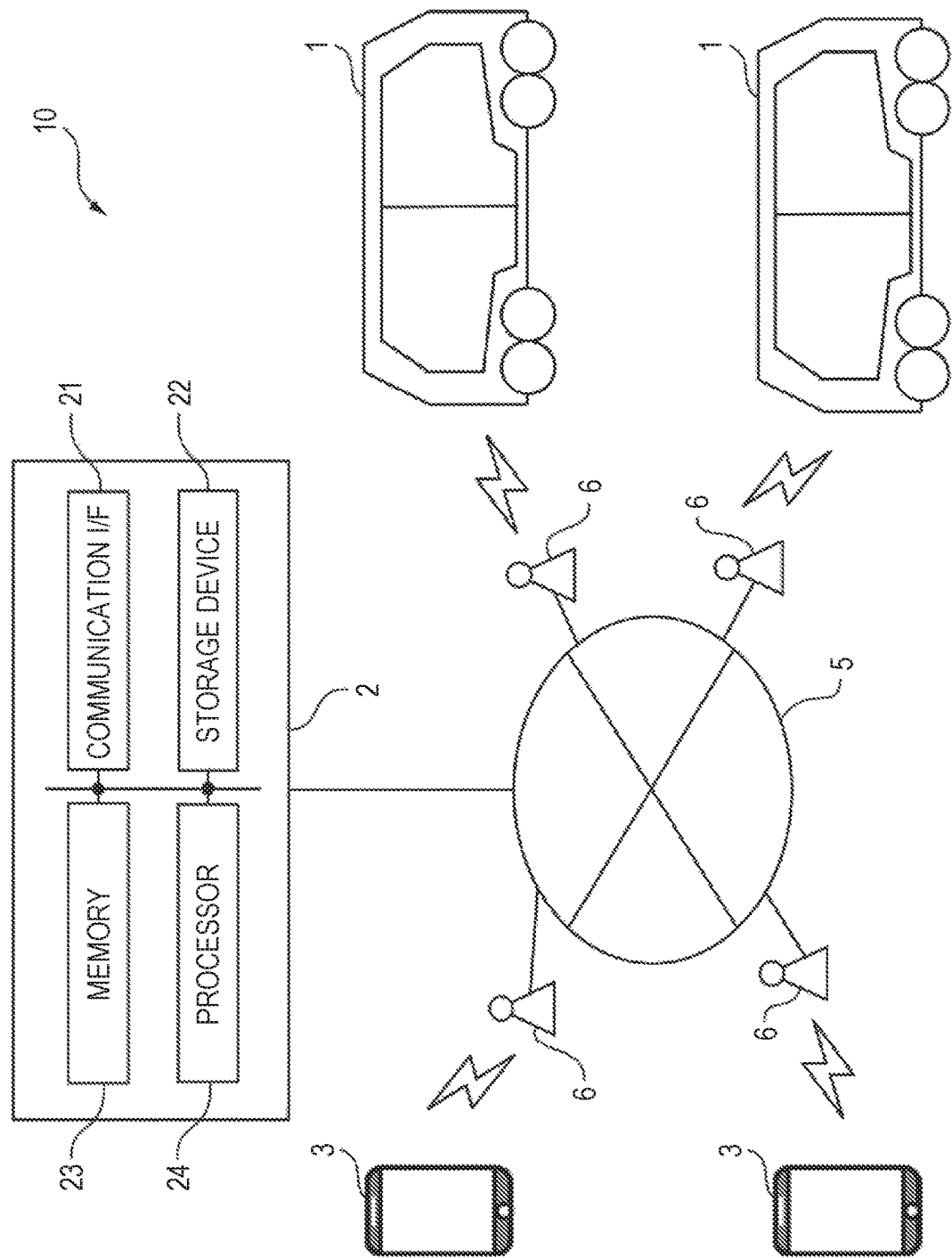
FIG. 1 is a diagram schematically illustrating a configuration of a ridesharing system according to a first embodiment of the disclosure.

A first embodiment of the disclosure will be described below with reference to FIGS. 1 to 5. FIG. 1 is a diagram schematically illustrating a configuration of a ridesharing system according to the first embodiment of the disclosure. The ridesharing system 10 provides a ridesharing service to a user who has been registered in advance by applying online or the like. In a ridesharing service, a user is transported to a desired destination using a vehicle 1 which travels autonomously in accordance with a vehicle allocation request from the user. In a ridesharing service, a plurality of users with destinations close to each other can simultaneously use one vehicle 1.

As illustrated in FIG. 1, the ridesharing system 10 includes a vehicle 1, a server 2, and a mobile terminal 3. The vehicle 1, the server 2, and the mobile terminal 3 can communicate with each other.

The vehicle 1 is configured to provide a ridesharing service by autonomous traveling. In a ridesharing service, a plurality of vehicles 1 is used. The vehicle 1 is an automated-driving vehicle that travels autonomously and does not require a driver who operates the vehicle 1.

Figure 2:
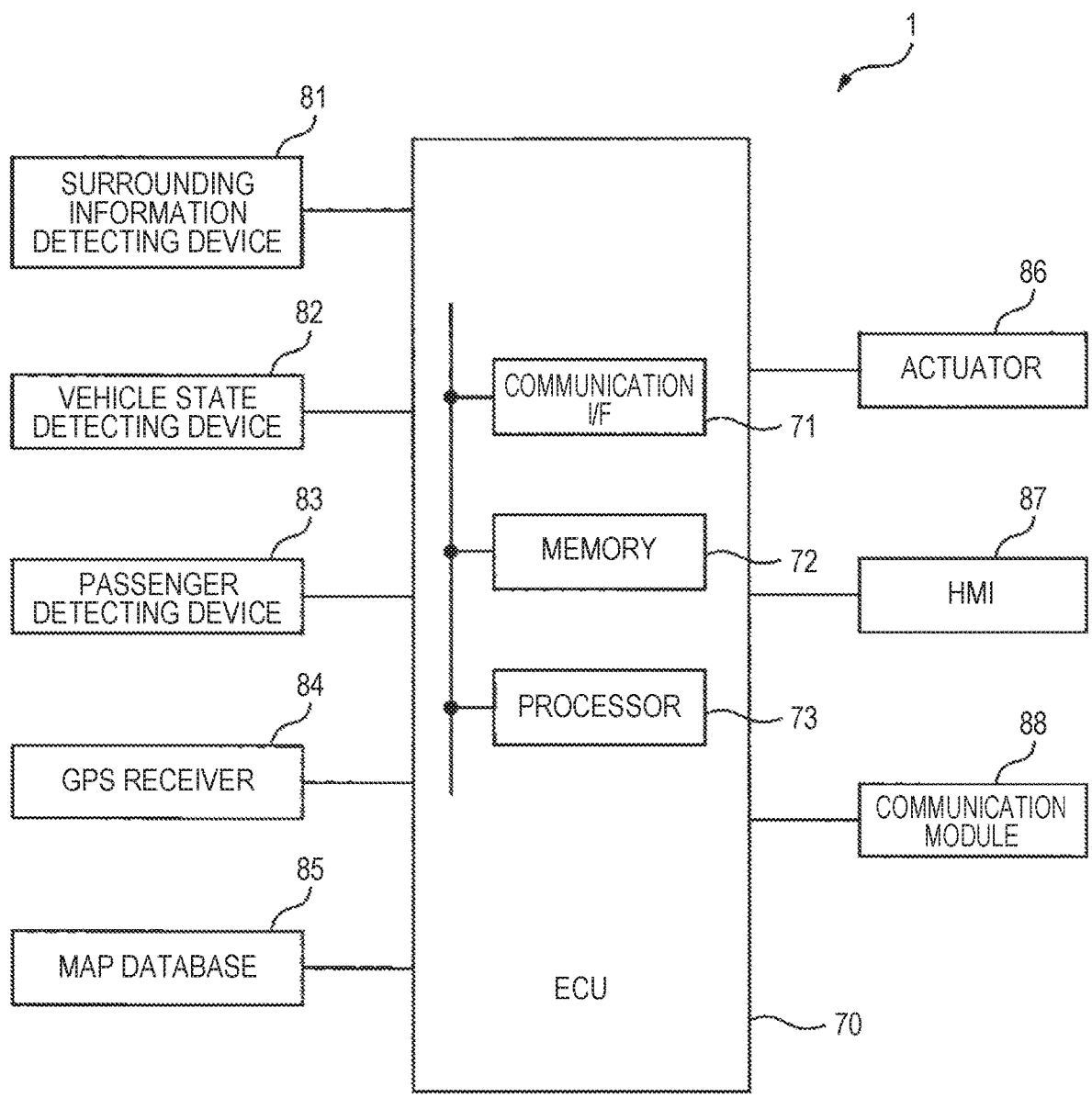
FIG. 2 is a diagram schematically illustrating a configuration of a vehicle.

FIG. 2 is a diagram schematically illustrating a configuration of a vehicle 1. The vehicle 1 includes an electronic control unit (ECU) 70. The ECU 70 includes a communication interface 71, a memory 72, and a processor 73 and executes various types of control of the vehicle 1. The communication interface 71 and the memory 72 are connected to the processor 73 via signal lines. The ECU 70 is an example of a control device for a vehicle. A single ECU 70 is provided in this embodiment, but a plurality of ECUs may be provided for functions.

The communication interface 71 includes an interface circuit that connects the ECU 70 to an onboard network based on the standard of controller area network (CAN). The ECU 70 communicates with another onboard device via the communication interface 71.

The memory 72 includes, for example, a volatile semiconductor memory (for example, a RAM) and a nonvolatile semiconductor memory (for example, a ROM). The memory 72 stores programs which are executed by the processor 73 and various types of data which are used for the processor 73 to perform various processes.

The processor 73 includes one or more central processing units (CPUs) and peripheral circuits thereof and performs various processes. The processor 73 may further include an arithmetic operation circuit such as a logical operation unit or a numerical operation unit.

The vehicle 1 includes a surrounding information detecting device 81. The surrounding information detecting device 81 detects surrounding information of the vehicle 1 for autonomous traveling of the vehicle 1. The surrounding information includes information of white lines of a road, other vehicles, pedestrians, bicycles, buildings, marks, signals, obstacles, and the like. The surrounding information detecting device 81 is connected to the ECU 70 via the onboard network and an output of the surrounding information detecting device 81 is transmitted to the ECU 70. For example, the surrounding information detecting device 81 includes an outside camera, a millimeter wave radar, a laser imaging detection and ranging (LIDAR) device, and an ultrasonic sensor. The outside camera images the outside of the vehicle 1 and generates a surrounding image.

The vehicle 1 further includes a vehicle state detecting device 82. The vehicle state detecting device 82 detects a state of the vehicle 1 for autonomous traveling of the vehicle 1. The vehicle state detecting device 82 is connected to the ECU 70 via the onboard network and an output of the vehicle state detecting device 82 is transmitted to the ECU 70. For example, the vehicle state detecting device 82 includes a vehicle speed sensor and a yaw rate sensor. The vehicle speed sensor detects a speed of the vehicle 1. The yaw rate sensor detects a yaw rate which is a rotation speed around a vertical axis passing through the center of gravity of the vehicle 1.

The vehicle 1 includes a passenger detecting device 83. The passenger detecting device 83 detects a passenger in the vehicle 1. The passenger detecting device 83 is connected to the ECU 70 via the onboard network and an output of the passenger detecting device 83 is transmitted to the ECU 70. For example, the passenger detecting device 83 includes an inside camera, a seat belt sensor, a seating sensor, and an information reader. The inside camera images the inside of the vehicle 1 and generates an inside image. The inside camera is disposed, for example, on the ceiling of the vehicle 1 to image a passenger in the vehicle 1. The inside camera may include a plurality of cameras which are disposed at different positions in the vehicle.

The seat belt sensor detects whether a passenger wears a seat belt. The seating sensor detects whether a passenger sits on a seat. The seat belt sensor and the seating sensor are provided for each seat. The information reader reads identification information of the mobile terminal 3, a QR code (registered trademark) or a password which is transmitted to a user as vehicle allocation information, card information of a usage card for using the ridesharing service, and the like. The information reader is disposed in the vicinity of a door of the vehicle 1 or is provided for each seat.

The vehicle 1 includes a GPS receiver 84. The GPS receiver 84 receives signals from three or more GPS satellites and detects a current position of the vehicle 1 (for example, the latitude and longitude of the vehicle 1). The GPS receiver 84 is connected to the ECU 70 via the onboard network and an output of the GPS receiver 84 is transmitted to the ECU 70.

The vehicle 1 includes a map database 85. The map database 85 includes map information. Map information includes road information such as position information of roads, shape information of roads (for example, types of a curved road and a straight road, a radius of curvature of a curved road, and a road gradient), road types, and speed limits. The map database 85 is connected to the ECU 70 via the onboard network and the ECU 70 acquires map information from the map database 85. The map information stored in the map database 85 is updated with data received from the outside of the vehicle 1, a simultaneous localization and mapping (SLAM) technique, or the like.

The vehicle 1 includes an actuator 86. The actuator 86 causes the vehicle 1 to operate. The actuator 86 is connected to the ECU 70 via the onboard network and the ECU 70 controls the actuator 86. For example, the actuator 86 includes a driving device (at least one of an engine and a motor) for accelerating the vehicle 1, a brake actuator for braking the vehicle 1, a steering motor for steering the vehicle 1, and a door actuator for opening and closing a door of the vehicle 1 or controlling a door lock thereof.

The vehicle 1 includes a human-machine interface (HMI) 87. The HMI 87 is an interface for performing input and output of information between a passenger and the vehicle 1. The HMI 87 includes, for example, a display that displays information, a speaker that generates sound, operation buttons or a touch screen used for a passenger to perform an input operation, and a microphone that receives voice of a passenger. The HMI 87 is connected to the ECU 70 via the onboard network, an output of the ECU 70 is delivered to a passenger via the HMI 87, and input information from a passenger is input to the ECU 70 via the HMI 87.

The vehicle 1 includes a communication module 88. The communication module 88 is a device that enables communication between the vehicle 1 and the outside of the vehicle 1. The communication module 88 includes, for example, a data communication module (DCM) and a short-range radio communication module (for example, a WiFi module or a Bluetooth (registered trademark) module). The data communication module communicates with the server 2 via a radio base station 6 and a communication network 5. The short-range radio communication module communicates directly with the mobile terminal 3.

The server 2 is provided outside the vehicle 1 and manages a user and the vehicle 1 to efficiently provide the ridesharing service. Specifically, the server 2 performs registration of user information, matching between a user and a vehicle 1, creation of a traveling plan, settlement of a usage fee, and the like.

As illustrated in FIG. 1, the server 2 includes a communication interface 21, a storage device 22, a memory 23, and a processor 24. The communication interface 21, the storage device 22, and the memory 23 are connected to the processor 24 via signal lines. The server 2 may further include an input device such as a keyboard and a mouse and an output device such as a display. The server 2 may be constituted by a plurality of computers.

The communication interface 21 includes an interface circuit that connects the server 2 to the communication network 5. The server 2 communicates with the vehicle 1 and the mobile terminal 3 via the communication interface 21.

The storage device 22 includes, for example, a hard disk drive (HDD), a solid state drive (SSD), or an optical recording medium. The storage device 22 stores various types of data and stores, for example, user information, vehicle information, map information, and computer programs which are used for the processor 24 to perform various processes. The computer programs may be recorded on a recording medium such as an optical recording medium or a magnetic recording medium and distributed.

The memory 23 includes, for example, a semiconductor memory such as a random access memory (RAM). The memory 23 stores, for example, various types of data which are used for the processor 24 to perform various processes.

The processor 24 includes one or more CPUs and peripheral circuits thereof and performs various processes. The processor 24 may further include an arithmetic operation circuit such as a logical operation unit or a numerical operation unit.

The mobile terminal 3 is carried by a user and can move along with the user. The mobile terminal 3 is a device that communicates with the server 2 via the radio base station 6 and the communication network 5. The mobile terminal 3 includes an input device such as a touch panel and a microphone and an output device such as a display and a speaker. Examples of the mobile terminal 3 include a smartphone, a tablet terminal, and a personal computer.

Figure 3:
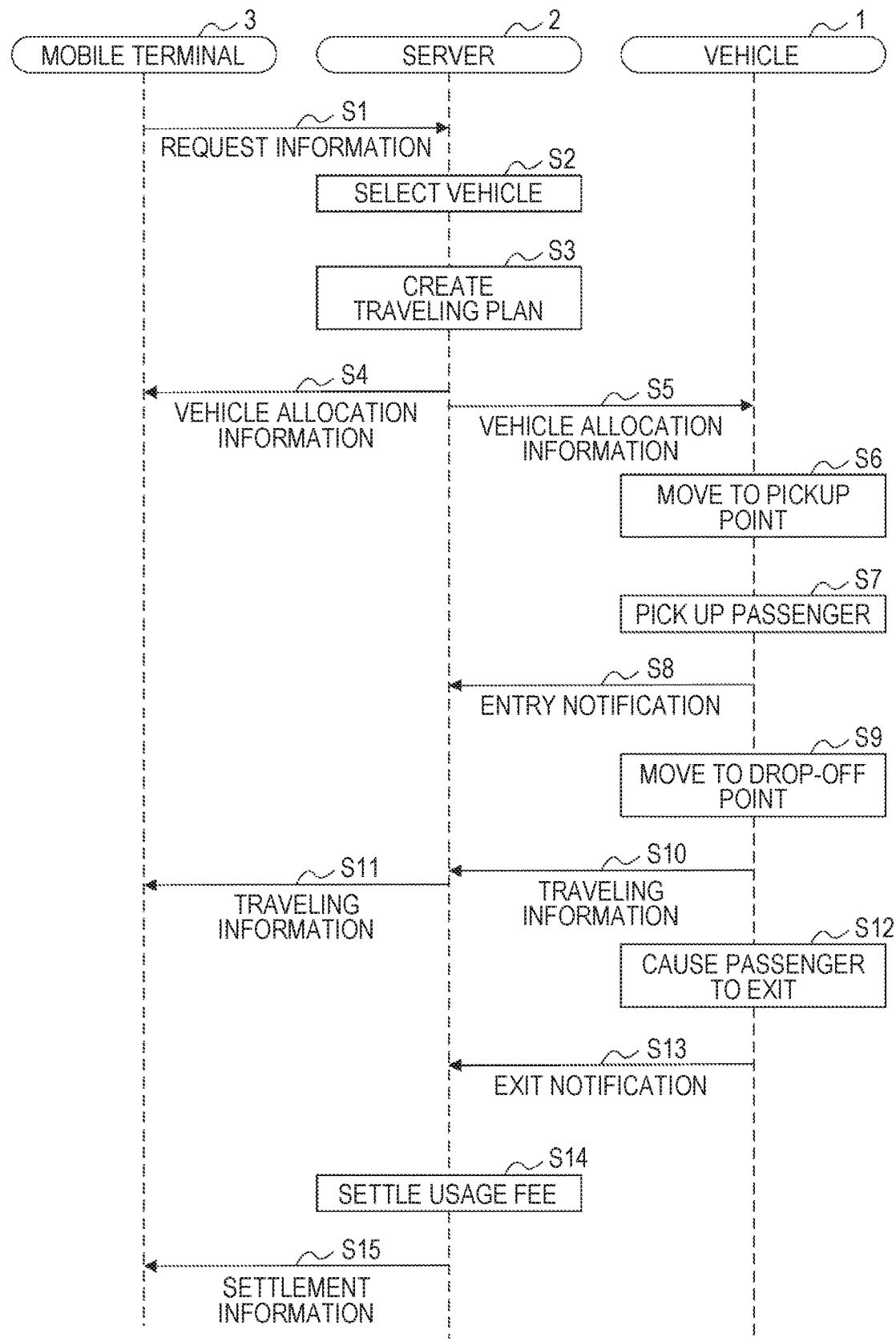
FIG. 3 is a sequence diagram illustrating an example of an operation of the ridesharing system.

A process flow of a ridesharing service will be described below in brief with reference to FIG. 3. FIG. 3 is a sequence diagram illustrating an example of an operation of the ridesharing system 10. In the sequence diagram, communication between the server 2 and the mobile terminal 3 and communication between the server 2 and the vehicle 1 are carried out via the communication network 5.

When a user requests use of the ridesharing service, the user inputs request information to the mobile terminal 3 by operating the mobile terminal 3. Input of request information is performed, for example, over an application for the ridesharing service which is installed in the mobile terminal 3. When request information is input to the mobile terminal 3, the mobile terminal 3 transmits the request information to the server 2 (step S1). The request information includes a pickup point, a drop-off point, user identification information (for example, a registration number of a user), fellow passenger information (such as the number of occupants), and information on whether sharing a vehicle with another user is permitted. The pickup point refers to a desired entry position of a user. The drop-off point refers to a desired exit position of a user.

When request information is received from a user via the mobile terminal 3, the server 2 selects a vehicle 1 which is suitable for transportation of the user (step S2). That is, the server 2 performs matching between a user and a vehicle 1. The vehicle 1 which is suitable for transportation of a user is, for example, a standby vehicle 1 which is closest to the pickup point. When a user permits sharing a vehicle with another user, a vehicle 1 which is being used by another user may be selected.

The server 2 creates a traveling plan for transportation of the user (step S3). The traveling plan includes a scheduled arrival time at the pickup point, a traveling route to the drop-off point, and a scheduled arrival time at a destination.

Subsequently, the server 2 transmits vehicle allocation information to the mobile terminal 3 (step S4). Vehicle allocation information for the mobile terminal 3 includes a scheduled arrival time at the pickup point, a traveling route to the drop-off point, a scheduled arrival time at the drop-off point, identification information of the vehicle 1 (such as a number of a number plate, a vehicle model, and a vehicle color), and information on whether sharing a vehicle with another user is permitted. The server 2 transmits vehicle allocation information to the vehicle 1 (step S5). The vehicle allocation information for the vehicle 1 includes a pickup point, a drop-off point, a traveling route to the drop-off point, and user identification information.

When vehicle allocation information is received from the server 2, the vehicle 1 starts movement to a pickup point (step S6). Thereafter, when the vehicle 1 arrives at the pickup point, the vehicle 1 picks up a passenger (step S7).

After a passenger has entered the vehicle 1, the vehicle 1 notifies the server 2 that the passenger has entered the vehicle 1. Specifically, the vehicle 1 transmits an entrance notification to the server 2 (step S8). After the passenger has entered the vehicle 1, the vehicle 1 starts movement to a drop-off point (step S9).

While moving to the drop-off point, the vehicle 1 transmits traveling information to the server 2 at predetermined intervals (step S10). The traveling information which is transmitted to the server 2 includes a current position of the vehicle 1 and surrounding information of the vehicle 1. The server 2 transmits traveling information to the mobile terminal 3 at predetermined intervals while moving to the drop-off point (step S11). The traveling information which is transmitted to the mobile terminal 3 includes a current position of the vehicle 1, a scheduled arrival time at the drop-off point, and traffic congestion information of a traveling route.

Thereafter, when the vehicle 1 arrives at the drop-off point, the vehicle 1 allows the passenger to exit the vehicle 1 (step S12). After the passenger has exited the vehicle 1, the vehicle 1 notifies the server 2 that the passenger has exited. Specifically, the vehicle 1 transmits an exit notification to the server 2 (step S13).

The server 2 settles a usage fee of the ridesharing service after the passenger has exited (step S14). For example, the server 2 settles a usage fee by account-to-account transfer or credit card payment based on user information stored in the storage device 22 of the server 2. After the usage fee has been settled, the vehicle 1 transmits settlement information including settlement details to the mobile terminal 3 (step S15).

When use of the ridesharing service is requested as described above, the vehicle 1 picks up a passenger at a pickup point. However, when the door of the vehicle 1 is opened at the pickup point, a person other than passengers (a user and a fellow passenger of the user) who are supposed to use the ridesharing service can enter the vehicle 1. A user may allow a person who is not indicated by request information to enter the vehicle 1.

In the vehicle 1, there is no driver unlike a taxi in the related art. Accordingly, it is difficult to manage passengers in the vehicle 1 and the vehicle 1 may depart in a state which is not indicated by the request information. Therefore, in this embodiment, whether the vehicle 1 is to depart is determined by comparing a passenger who is supposed to use the ridesharing service with an actual passenger entering the vehicle 1.

Figure 4:
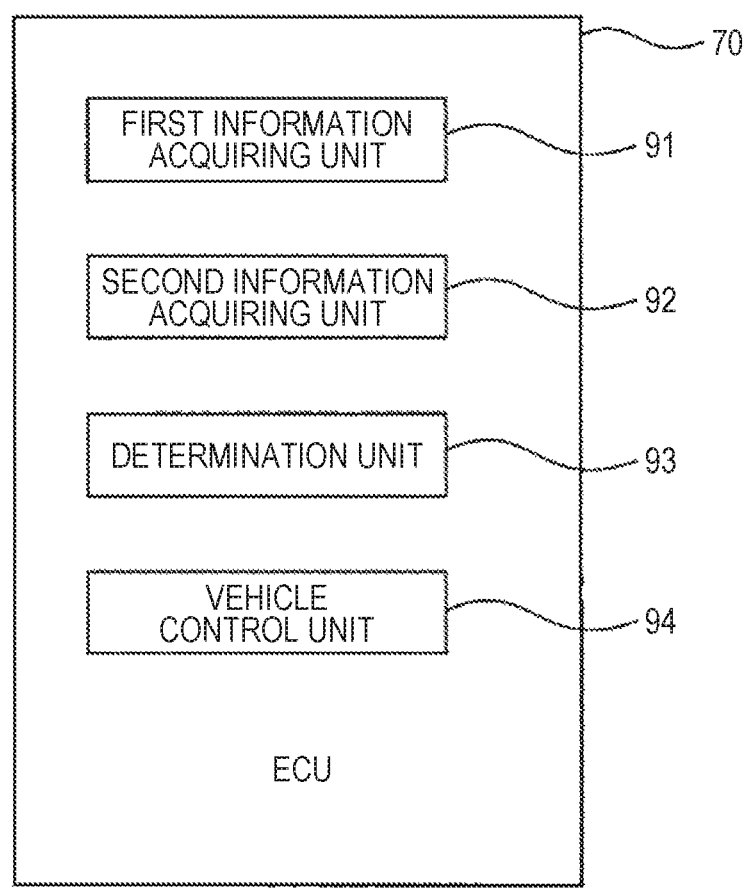
FIG. 4 is a functional block diagram of an electronic control unit (ECU) of the vehicle according to the first embodiment.

FIG. 4 is a functional block diagram illustrating the ECU 70 of the vehicle 1 according to the first embodiment. In this embodiment, the ECU 70 includes a first information acquiring unit 91, a second information acquiring unit 92, a determination unit 93, and a vehicle control unit 94. The first information acquiring unit 91, the second information acquiring unit 92, the determination unit 93, and the vehicle control unit 94 are functional blocks which are embodied by causing the processor 73 of the ECU 70 to execute a program stored in the memory 72 of the ECU 70.

The first information acquiring unit 91 acquires first information of a passenger who is supposed to use the ridesharing service. The second information acquiring unit 92 acquires second information of a passenger who has entered the vehicle 1 at a pickup point. The determination unit 93 determines whether the vehicle 1 is to depart by comparing the first information with the second information. The vehicle control unit 94 controls the vehicle 1 using the actuator 86. At the time of picking up a passenger, the vehicle control unit 94 controls the vehicle 1 based on the determination result from the determination unit 93.

When the first information is different from the second information, a passenger who is not included in the request information has entered the vehicle 1 or a passenger who is included in the request information has not entered the vehicle 1. Accordingly, when the first information is different from the second information, the determination unit 93 prohibits departure of the vehicle 1. Accordingly, it is possible to prevent the vehicle 1 from departing in a state which is not indicated by the request information.

<Pickup Process>

Figure 5:
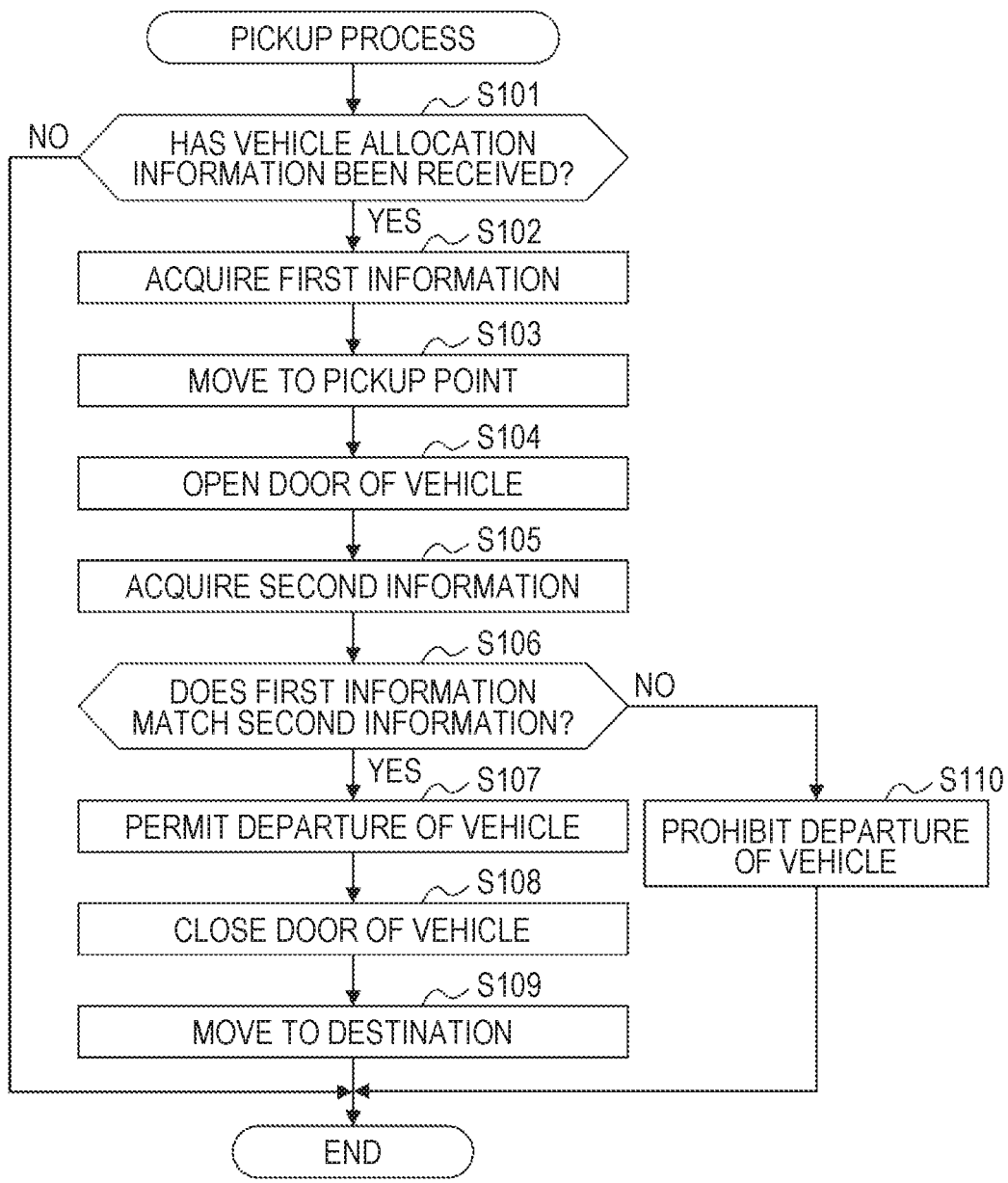
FIG. 5 is a flowchart illustrating a control routine of a pickup process according to the first embodiment.

Control when the vehicle 1 picks up a passenger will be described below with reference to FIG. 5. FIG. 5 is a flowchart illustrating a control routine of a pickup process according to the first embodiment. This control routine is repeatedly performed by the ECU 70.

First, in Step S101, the first information acquiring unit 91 determines whether the vehicle 1 (specifically, the ECU 70) has received vehicle allocation information from the server 2. When it is determined that the vehicle 1 has not received vehicle allocation information, the control routine ends. On the other hand, when it is determined that the vehicle 1 has received vehicle allocation information, the control routine progresses to step S102.

In Step S102, the first information acquiring unit 91 acquires first information of a passenger who is supposed to use the ridesharing service (hereinafter referred to as a "supposed passenger"). The supposed passenger includes a user who has requested use of the ridesharing service (hereinafter referred to as a "requester") and a fellow passenger of the user. The first information is, for example, identification information of the supposed passenger. In this case, the fellow passenger is also registered as a user in advance and user information of the fellow passenger is also stored in the server 2.

Examples of the identification information includes an identification number of the mobile terminal 3 (such as a MAC address) which is carried by the supposed passenger, a face image of the supposed passenger, card information of a usage card which is carried by the supposed passenger, a QR code or a password which is transmitted to the supposed passenger, or a combination thereof. When the identification information is the identification number of the mobile terminal 3, the face image, or card information of a usage card, the identification information is stored in the server 2 in advance for each user, and the identification information of the supposed passenger is transmitted from the server 2 to the vehicle 1 as vehicle allocation information. When the identification information is a QR code or a password, the identification information is transmitted to the supposed passenger and the vehicle 1 as vehicle allocation information.

Subsequently, in step S103, the vehicle control unit 94 moves the vehicle 1 to a pickup point by controlling the actuator 86 (specifically, the driving device, the brake actuator, and the steering motor). Subsequently, in step S104, the vehicle control unit 94 opens the door of the vehicle 1 by controlling the actuator 86 (specifically, the door actuator). The vehicle control unit 94 may unlock the door of the vehicle 1 by controlling the actuator 86 (specifically, the door actuator).

Subsequently, in step S105, the second information acquiring unit 92 acquires second information of a passenger who has entered the vehicle 1 (hereinafter, referred to as a "pickup passenger") at the pickup point using the passenger detecting device 83. The second information is the same type of information as the first information and is, for example, identification information of the pickup passenger.

The identification information is, for example, an identification number of the mobile terminal 3 (such as a MAC address) which is carried by a pickup passenger, a face image of a pickup passenger, card information of a usage card which is carried by a pickup passenger, a QR code or a password which is transmitted to a pickup passenger, or a combination thereof. When the identification information is an identification number of the mobile terminal 3, card information, a QR code, or a password, the identification information is detected by an information reader. When the identification information is a face image, the identification information is detected by the inside camera.

Subsequently, in step S106, the determination unit 93 compares the first information with the second information and determines whether the first information and the second information match each other. For example, when the identification information of some supposed passengers has not been detected as identification information of pickup passengers, it is determined that the first information and the second information do not match each other. When identification information other than the identification information of the supposed passengers has been detected as identification information of the pickup passengers, it is determined that the first information and the second information do not match each other.

When it is determined in step S106 that the first information and the second information match each other, the control routine progresses to step S107. In step S107, the determination unit 93 permits departure of the vehicle 1. Subsequently, in Step S108, the vehicle control unit 94 closes the door of the vehicle 1 by controlling the actuator 86 (specifically, the door actuator). After the door of the vehicle 1 has been closed by a passenger, the vehicle control unit 94 may operate the door lock of the vehicle 1 by controlling the actuator 86 (specifically, the door actuator).

Subsequently, in step S109, the vehicle control unit 94 moves the vehicle 1 to a destination (a drop-off point or a pickup point of another passenger) by controlling the actuator 86 (specifically, the driving device, the brake actuator, and the steering motor). After step S109, the control routine ends.

On the other hand, when it is determined in step S106 that the first information and the second information do not match each other, the control routine progresses to step S110. In step S110, the determination unit 93 prohibits departure of the vehicle 1. In step S110, the determination unit 93 may notify the server 2 that departure of the vehicle 1 has been prohibited. After step S110, the control routine ends. In this case, the vehicle control unit 94 does not permit the vehicle 1 to depart from the pickup point.

The first information may be the number of supposed passengers and the second information may be the number of pickup passengers. In this case, the first information is transmitted as request information from a user to the server 2 via the mobile terminal 3, and is transmitted as vehicle allocation information from the server 2 to the vehicle 1. The second information is detected by the passenger detecting device 83. Specifically, the number of pickup passengers is detected by the inside camera, the seat belt sensor, the seating sensor, or a combination thereof.

Second Embodiment

A configuration and control of a control device for a vehicle according to a second embodiment are basically the same as those of the control device for a vehicle according to the first embodiment except the following points. Accordingly, differences of the second embodiment of the disclosure from the first embodiment will be mainly described below.

In the second embodiment, when a predetermined condition has been satisfied, prohibition of departure of the vehicle 1 is removed. Accordingly, it is possible to improve convenience of the ridesharing service.

Figure 6:
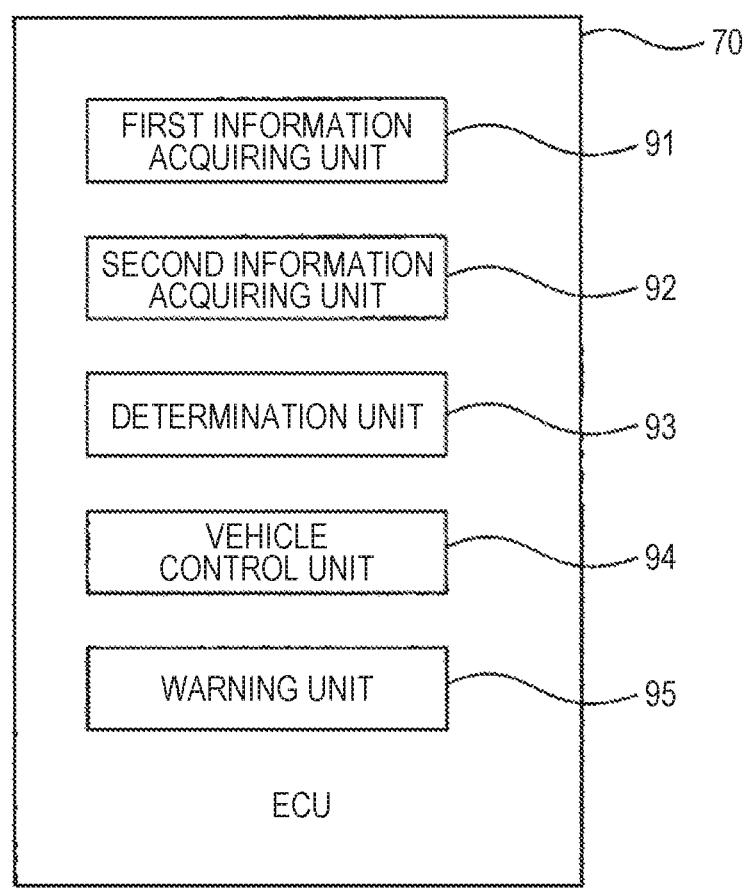
FIG. 6 is a functional block diagram of an ECU of the vehicle according to a second embodiment.

FIG. 6 is a functional block diagram of an ECU 70 of a vehicle 1 according to the second embodiment. In the second embodiment, the ECU 70 includes a warning unit 95 in addition to a first information acquiring unit 91, a second information acquiring unit 92, a determination unit 93, and a vehicle control unit 94. The first information acquiring unit 91, the second information acquiring unit 92, the determination unit 93, the vehicle control unit 94, and the warning unit 95 are functional blocks which are embodied by causing the processor 73 of the ECU 70 to execute a program stored in the memory 72 of the ECU 70.

The warning unit 95 gives a warning to a pickup passenger when the first information of supposed passengers and the second information of pickup passengers do not match each other. Accordingly, it is possible to notify the pickup passenger of mismatch between the passengers and to prompt the pickup passengers to solve the mismatch. For example, when there is a passenger other than supposed passengers, the passenger other than the supposed passengers is prompted to exit. When fellow passenger information which is transmitted as the request information is changed, the first information is corrected by a requester.

When the first information of the supposed passenger and the second information of the pickup passengers match after a warning has been given by the warning unit 95, the determination unit 93 removes prohibition of departure of the vehicle 1.

Since there is no driver in the vehicle 1, the request serves as a substantial manager of the vehicle 1. Accordingly, the determination unit 93 permits departure of the vehicle 1 when the requester has approved of departure of the vehicle 1.

When the vehicle 1 stops continuously at a pickup point, an arrival time to a destination is greatly delayed and convenience of the ridesharing service is damaged. Accordingly, when a stoppage time of the vehicle 1 at the pickup point reaches a predetermined time, the determination unit 93 removes prohibition of departure of the vehicle 1.

By removing prohibition of departure of the vehicle 1 as described above, it is possible to curb stopping of the ridesharing service due to mismatch between the passengers.

<Pickup Process>

Figure 7:
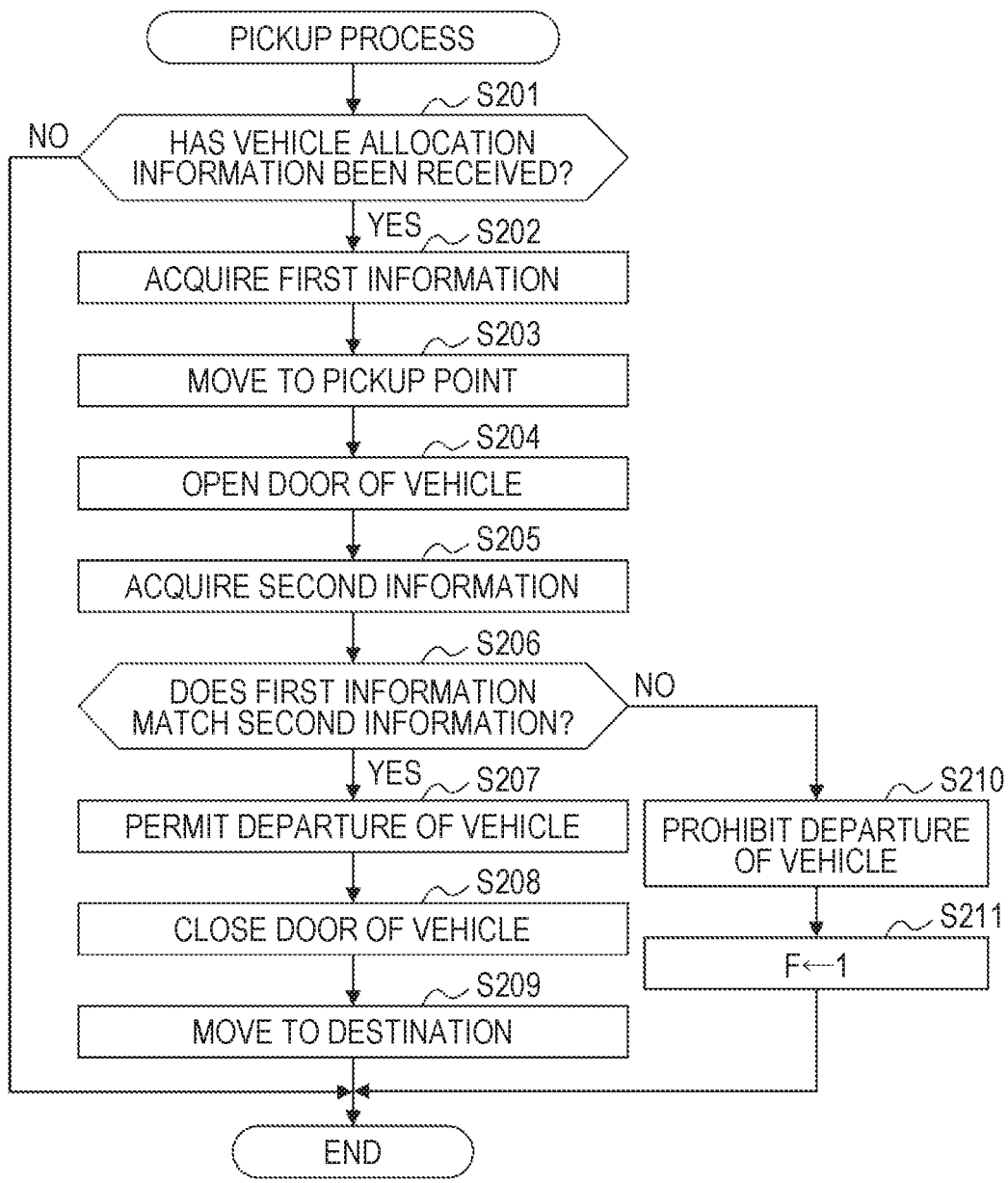
FIG. 7 is a flowchart illustrating a control routine of a pickup process according to the second embodiment.

FIG. 7 is a flowchart illustrating a control routine of a pickup process according to the second embodiment. This control routine is repeatedly performed by the ECU 70. Steps S201 to S210 are the same as steps S101 to S110 in FIG. 5 and thus description thereof will not be repeated.

After departure of the vehicle 1 has been prohibited in step S210, the control routine progresses to step S211. In step S211, the determination unit 93 sets a departure prohibition flag F to 1. The departure prohibition flag F is a flag which is set to 1 when departure of the vehicle 1 has been prohibited and is set to zero when prohibition of departure of the vehicle 1 has been removed. The departure prohibition flag F is stored in the memory 72 of the ECU 70, and an initial value of the departure prohibition flag F is zero. After step S211, the control routine ends.

<Prohibition Removing Process>

Figure 8A:
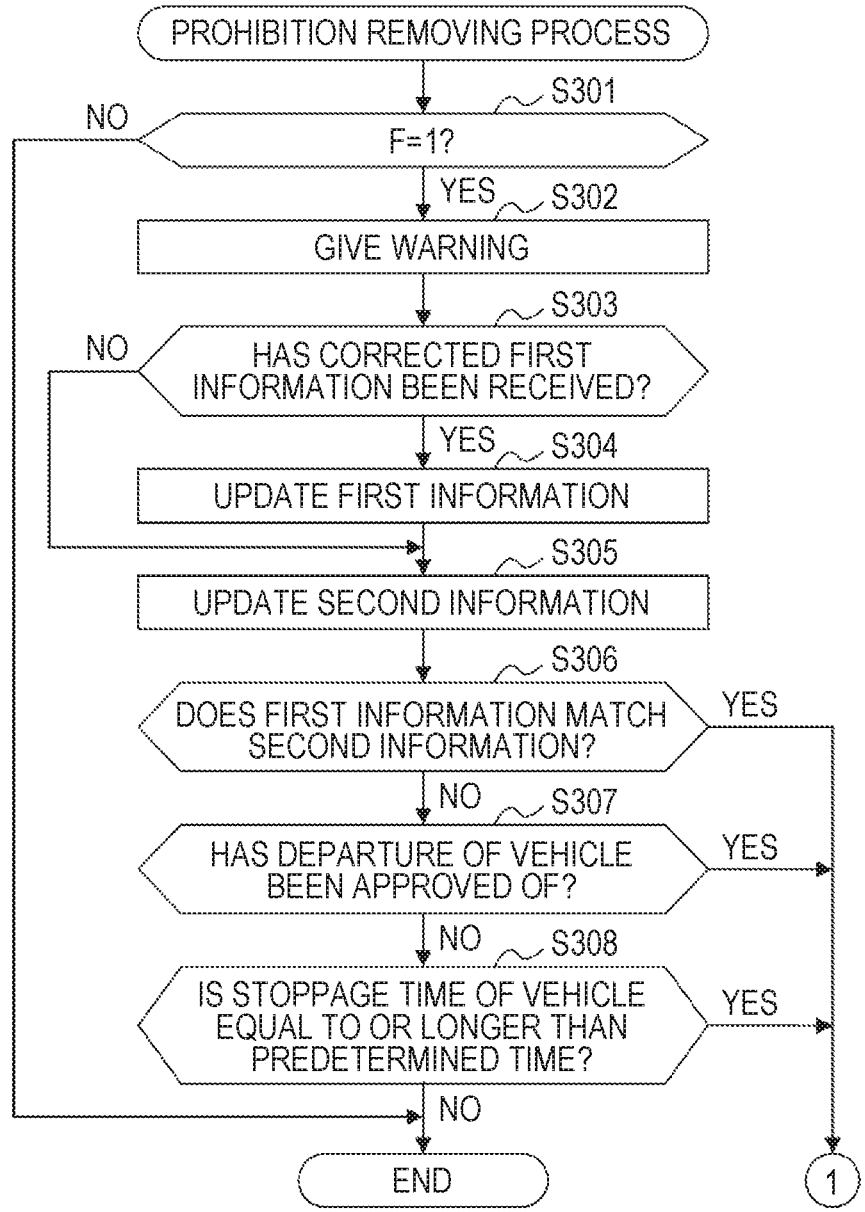
FIG. 8A is a flowchart illustrating a control routine of a prohibition removing process according to the second embodiment.
Figure 8B:
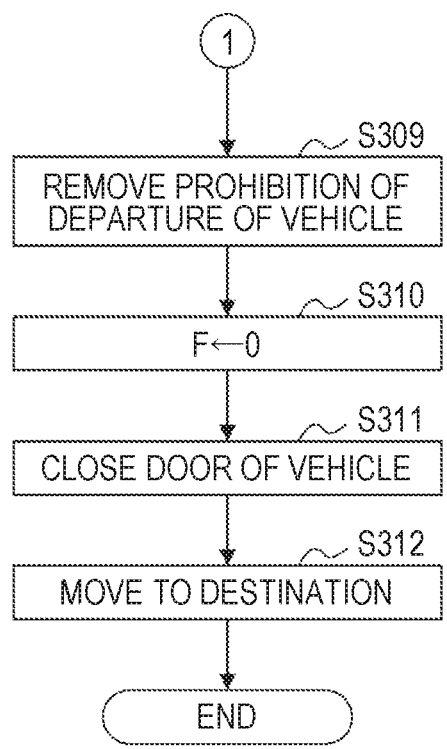
FIG. 8B is a flowchart illustrating a control routine of the prohibition removing process according to the second embodiment.

FIGS. 8A and 8B are flowcharts illustrating a control routine of a prohibition removing process according to the second embodiment. This control routine is repeatedly performed by the ECU 70.

First, in step S301, the determination unit 93 determines whether the departure prohibition flag F is set to 1. When it is determined that the departure prohibition flag F is set to zero, the control routine ends. On the other hand, when it is determined that the departure prohibition flag F is set to 1, that is, when departure of the vehicle 1 is prohibited, the control routine progresses to step S302.

In step S302, the warning unit 95 gives a warning to the pickup passengers. For example, the warning unit 95 gives a warning to the pickup passengers by sound, characters, light, and the like using at least one of the passenger detecting device 83 and the HMI 87.

In step S303, the first information acquiring unit 91 determines whether the ECU 70 has received corrected first information from the server 2 or the mobile terminal 3. When correction of the first information is desired, the supposed passengers correct the first information via the mobile terminal 3 or the HMI 87. The first information which has been corrected via the mobile terminal 3 is transmitted to the server 2 and is transmitted from the mobile terminal 3 to the ECU 70 directly or via the server 2. The first information which has been corrected via the HMI 87 is transmitted from the HMI 87 to the ECU 70.

When it is determined in step S303 that the ECU 70 has received corrected first information, the control routine progresses to step S304. In step S304, the first information acquiring unit 91 updates the first information by correcting the first information. After step S304, the control routine progresses to step S305. On the other hand, when it is determined in step S303 that the ECU 70 has not received corrected first information, the control routine skips step S304 and progresses to step S305.

In step S305, the second information acquiring unit 92 acquires the second information again and updates the second information. When a passenger's operation is required for acquiring the second information and, for example, when the second information is card information of a usage card, a QR code, or a password, the second information acquiring unit 92 prompts the passenger to present the second information using the HMI 87.

Subsequently, in step S306, the determination unit 93 determines whether the first information and the second information match each other. When it is determined that the first information and the second information do not match each other, the control routine progresses to step S307.

In step S307, the determination unit 93 determines whether the requester has approved of departure of the vehicle 1. When departure of the vehicle 1 is desired, the requester approves of departure of the vehicle 1 via the mobile terminal 3 or the HMI 87. When departure of the vehicle 1 has been approved of via the mobile terminal 3, approval information is transmitted from the mobile terminal 3 to the ECU 70 directly or via the server 2. When departure of the vehicle 1 has been approved of via the HMI 87, approval information is transmitted from the HMI 87 to the ECU 70. When there is a plurality of requesters in the vehicle 1, the determination unit 93 may determine whether all the requesters have approved of departure of the vehicle 1.

When it is determined in step S307 that departure of the vehicle 1 has not been approved of, the control routine progresses to step S308. In step S308, the determination unit 93 determines whether a stoppage time of the vehicle 1 at a pickup point is equal to or greater than a predetermined time. The predetermined time is determined in advance and is set to, for example, several minutes to several tens of minutes. When it is determined in step S308 that the stoppage time of the vehicle 1 is less than the predetermined time, the control routine ends.

The predetermined time may be set based on a traveling plan of the vehicle 1. Accordingly, it is possible to prevent a traveling plan of the vehicle 1 from changing much due to mismatch between the passengers. For example, the predetermined time is set such that a delay time of a scheduled arrival time to a destination (a drop-off point or a pickup point of another passenger) is equal to or less than a predetermined threshold value.

On the other hand, when it is determined in step S306 that the first information and the second information match each other, when it is determined in step S307 that departure of the vehicle 1 has been approved of, or when it is determined in step S308 that the stoppage time of the vehicle 1 is equal to or greater than the predetermined time, the control routine progresses to step S309. In step S309, the determination unit 93 removes prohibition of departure of the vehicle 1. That is, the determination unit 93 permits departure of the vehicle 1. Subsequently, in step S310, the determination unit 93 sets the departure prohibition flag F to zero.

Subsequently, in step S311, similarly to step S108 in FIG. 5, the vehicle control unit 94 closes the door of the vehicle 1 by controlling the actuator 86. Subsequently, in step S312, similarly to step S109 in FIG. 5, the vehicle control unit 94 moves the vehicle 1 to a destination by controlling the actuator 86. After step S312, the control routine ends.

Steps S302 to S306 may be skipped. Step S307 may be skipped. Step S308 may be skipped.

While an exemplary embodiment of the disclosure has been described above, the disclosure is not limited to the embodiment and can be subjected to various corrections and modifications without departing from description of the appended claims.

For example, the determination unit 93 may prohibit departure of the vehicle 1 when the number of pickup passengers is greater than the number of supposed, and may not prohibit departure of the vehicle 1 when the number of pickup passengers is equal to or smaller than the number of supposed passengers. In this case, the determination unit 93 removes prohibition of departure of the vehicle only when the first information and the second information match each other after the warning. Through this process using the determination unit 93, it is possible to prevent degradation in convenience of the ridesharing service and to prevent free riding and exceeding capacity of the vehicle 1 due to a passenger other than the supposed passengers.

The invention claimed is:

1. A control device for a vehicle that controls the vehicle configured to provide a ridesharing service by autonomous traveling, the control device for the vehicle comprising one or more processors programmed to:

acquire a user sharing preference from a user request of a requester, the requester having requested to use the ridesharing service, the user sharing preference indicating that sharing the vehicle with another user is permitted, and wherein based on sharing the vehicle with another user being permitted, select a vehicle currently being used by another user;

acquire first information of a number of passengers who are supposed to use the ridesharing service based on the number of passengers being included in the user request to use the ridesharing service;

acquire second information of a number of passengers who have entered the vehicle at a pickup point;

determine whether the vehicle is to depart by comparing the first information with the second information;

prohibit departure of the vehicle based on determining that the first information does not match the second information;

in response to the prohibition of departure of the vehicle, determine whether the first information is modified by a passenger of the number of passengers who are supposed to use the ridesharing service;

update the first information based on the determination that the first information is modified;

in response to updating the first information, acquire updated second information;

remove the prohibition of departure of the vehicle based on determining that the updated first information matches the updated second information; and in response to determining that the updated first information does not match the updated second information and that there are a plurality of requesters in the vehicle, the plurality of requesters having requested to use the ridesharing service, remove the prohibition of departure of the vehicle based on the approval of each of the plurality of requesters to depart the vehicle.

2. The control device for the vehicle according to claim 1, wherein the one or more processors are further programmed to:

acquire identification information of the passengers who are supposed to use the ridesharing service; and acquire identification information of the passengers who have entered the vehicle.

3. The control device for the vehicle according to claim 1, wherein the one or more processors are further programmed to:

prohibit departure of the vehicle based on the number of passengers who have entered the vehicle being greater than the number of passengers who are supposed to use the ridesharing service; and not prohibit departure of the vehicle based on the number of passengers who have entered the vehicle being equal to or smaller than the number of passengers who are supposed to use the ridesharing service.

4. The control device for the vehicle according to claim 1, wherein the one or more processors are further programmed to: remove the prohibition of departure of the vehicle based on a stoppage time of the vehicle at the pickup point having reached a predetermined time.

5. The control device for the vehicle according to claim 4, wherein the predetermined time is set based on a traveling plan for the vehicle.

6. The control device for the vehicle according to claim 1, wherein the one or more processors are further programmed to: give a warning based on determining that the first information does not match the second information; acquire further updated second information based on giving the warning; compare the first information and the further updated second information based on acquiring the further updated second information; and remove the prohibition of departure of the vehicle based on determining that the first information matches the further updated second information after the warning.

7. A method of operating a vehicle configured to provide a ridesharing service by autonomous traveling, the method comprising:

acquiring a user sharing preference from a user request of a requester, the requester having requested to use the ridesharing service, the user sharing preference indicating that sharing the vehicle with another user is permitted, and wherein based on sharing the vehicle with another user being permitted, select a vehicle currently being used by another user;

acquiring first information of a number of passengers who are supposed to use the ridesharing service based on the number of passengers being included in the user request to use the ridesharing service;

acquiring second information of a number of passengers who have entered the vehicle at a pickup point;

determining whether the vehicle is to depart by comparing the first information with the second information;

prohibiting departure of the vehicle based on determining that the first information does not match the second information;

in response to the prohibition of departure of the vehicle, determining whether the first information is modified by a passenger of the number of passengers who are supposed to use the ridesharing service;

updating the first information based on the determination that the first information is modified;

in response to updating the first information, acquiring updated second information;

removing the prohibition of departure of the vehicle based on determining that the updated first information matches the updated second information; and in response to determining that the updated first information does not match the updated second information and that there are a plurality of requesters in the vehicle, the plurality of requesters having requested to use the ridesharing service, removing the prohibition of departure of the vehicle based on the approval of each of the plurality of requesters to depart the vehicle.

8. The method of operating the vehicle according to claim 7, further comprising: giving a warning based on determining that the first information does not match the second information; acquiring further updated second information based on giving the warning; comparing the first information and the further updated second information based on acquiring the further updated second information; and removing the prohibition of departure of the vehicle based on determining that the first information matches the further updated second information after the warning.

* * * * *